United States Patent [19]

Shimizu et al.

[11] 4,091,939
[45] May 30, 1978

[54] BARREL STORAGE AND HANDLING APPARATUS

[75] Inventors: Kunitami Shimizu; Yoshiro Kaisaku, both of Nirazaki, Japan

[73] Assignee: Suntory Ltd., Osaka, Japan

[21] Appl. No.: 771,684

[22] Filed: Feb. 24, 1977

[30] Foreign Application Priority Data

Mar. 3, 1976  Japan .................................. 51-22955

[51] Int. Cl.² ............................................. B65G 47/00
[52] U.S. Cl. ............................ 214/16.4 A; 198/394;
                          214/340; 214/1 G; 214/DIG. 4
[58] Field of Search ........ 214/16.4 R, 16.4 A–16.4 C,
          214/DIG. 4, 11 R, 1 G, 340, 16 B; 198/380, 394

[56] References Cited

U.S. PATENT DOCUMENTS

| 268,748 | 12/1882 | Stewart | 214/16.4 A |
|---|---|---|---|
| 2,755,950 | 7/1956 | Forshey | 214/16.4 C X |
| 3,155,219 | 11/1964 | Sterrett | 214/1 G |
| 3,370,720 | 2/1968 | Schickle | 214/16 B |
| 3,398,842 | 8/1968 | Schickle | 214/16 B X |
| 3,536,212 | 10/1970 | Iversen | 214/16 B |
| 3,587,894 | 6/1971 | Parker et al. | 214/16.4 A |
| 3,610,398 | 10/1971 | Rice | 198/394 X |
| 3,972,432 | 8/1976 | Mori et al. | 214/340 |

FOREIGN PATENT DOCUMENTS

| 251,569 | 2/1964 | Netherlands | 214/16.4 C |
|---|---|---|---|
| 649,937 | 2/1951 | United Kingdom | 214/DIG. 4 |

*Primary Examiner*—Drayton E. Hoffman
*Assistant Examiner*—R. B. Johnson
*Attorney, Agent, or Firm*—Flynn & Frishauf

[57] ABSTRACT

A system for automatically locating barrels at given positions in store-racks with their plugs positioned at the tops of barrels, includes: a pair of rails which may be inclined, and on which barrels are to be placed; a pair of stoppers, each of which may be pivotally movable within a vertical plane and which are adapted to hold a barrel therebetween in their raised portions; a pair of position-adjusting guides positioned externally of the rails; a set of barrel turning discs rotatably mounted on a support which is movable up and down, and by which discs barrels are supported in rotatable relation; a plug-detecting-photoelectric-tube switch; a roller for measuring a maximum circumference of a barrel and the circumference of a barrel at the points of the barrel contacting rails on which the barrel rolls to the given position on racks; and a barrel-position-calculating control circuit. The barrels are of a beer-barrel type and the plugs are sealingly embedded in the shell of a barrel. This system particularly obviates manual adjustment of the position of the barrels on store-racks so as to bring the plugs at the tops of barrels, when placed on the racks broadwise.

11 Claims, 7 Drawing Figures

BARREL STORAGE AND HANDLING APPARATUS

BACKGROUND OF THE INVENTION

1. Field of the Invention

This invention relates to a system for locating barrels having respective plugs on the shells thereof on store-racks with the plugs positioned at the top of each barrel, and more particularly to a system for locating barrels of a beer-barrel type on store-racks, when barrels containing a liquid such as liquor therein are rolled to their given storage positions on the racks. The present invention is further associated with means for predetermining the positions of plugs and barrels at their position-presetting station so as to position the plugs at the top of each barrel, when barrels are stored broadwise (i.e., on their sides) on the store-racks.

2. Description of the Prior Art

In general, liquors are stored for a long period of time for aging and flavoring purposes. This is particularly true with spirituous liquors such as whisky, brandy, rum and the like, and fruit liquors such as wine and the like. Barrles for such use in general are of a beer-barrel type having a plug on the shell thereof, and have a maximum diameter of about 600 to 800 mm, and a length of about 800 to 1000 mm or over. In addition, barrels are equipped with plugs adapted to be sealingly embedded in the central portions of the bulging shell portion of the barrels, respectively. The weight of such a barrel, when filled with a liquor, is generally at least 250 kg; normally 300 kg and over. Barrels are stored on store-racks and are arranged broadwise on the racks. Thus, if the plugs are positioned at the bottom or toward the side, there is a danger of the liquors leaking from barrels, even if the plugs are properly sealingly embedded in the bulging shell portions of the barrels. Such a danger is most likely to take place with fermentative wine. For this reason, the plugs should be positioned at the top of each barrel when the barrels are stored broadwise on the racks.

It has been a common practice to use racks made of a plurality of frames for storing a plurality of barrels thereon. In this case, barrels are rolled on rails so as to be transported onto desired racks. This however poses a problem that plugs on the shells of the barrels are not always positioned at the top of each barrel when the barrel eventually reaches its final storage position on a rack. This is because there is generally a dimensional variation in the barrels of about ± 20 mm in diameter, and about ± 10 mm in length. Thus, there is required an expenditure of much time and effort for manually positioning the plugs at the tops of barrels in their final given positions on the store-racks. Moreover, it is difficult to roll barrels once they are placed in their final given positions on the racks so as to bring the positions of the plug at the top of each barrel, because of the considerable weight of the barrels (as high as 300 kg) and because there is insufficient space on the racks to permit operators to easily move the barrels.

It is accordingly a principal object of the present invention to provide a system for automatically locating barrels having plugs on the shells thereof on store-racks with their plugs in the top-most position so as to facilitate storing barrels on the racks with a minimum expenditure of time and effort.

It is a further object of the present invention to provide a system for locating the plugs of barrels at predetermined positions at a position-presetting station so that the plugs of each barrel will be located at the top of each barrel when the barrels are eventually stored on the rack broadwise.

SUMMARY OF THE INVENTION

According to the present invention, a system for locating barrels in store-racks, with their plugs positioned at the tops of the barrels, respectively, comprises a position-presetting station; a stand-by station adjacent to the position-presetting station; and a storage station adjacent to the stand-by station, the storage station including a plurality of store-racks and a stacker crane. The position-presetting station includes a pair of spaced rails for receiving rolling barrels thereon one after another; a pair of stoppers spaced apart in the direction of rolling of the barrels on the rails; a pair of spaced-apart position-adjusting guides positioned externally of the rails, the spacing of the guides being narrower towards a barrel-circumference measuring position; barrel turning means movable into and out of engagement with the barrels; a plug-position-detecting means pivotally mounted above the barrels for detecting a plug on a barrel; rollers pivotally mounted above said barrels for measuring a maximum circumference and a circumference of a barrel at the points where the barrel contacts the rails on which the barrel rolls; and a barrel position-calculating control circuit electrically connected to the rollers and to the plug-position-detecting means, for stopping the operation of the barrel turning means when the plug is oriented at a predetermined position whereby when transported to said store-racks, the plugs will be positioned at the uppermost position of the barrels.

DESCRIPTION OF THE PREFERRED EMBODIMENTS

Figure 1:
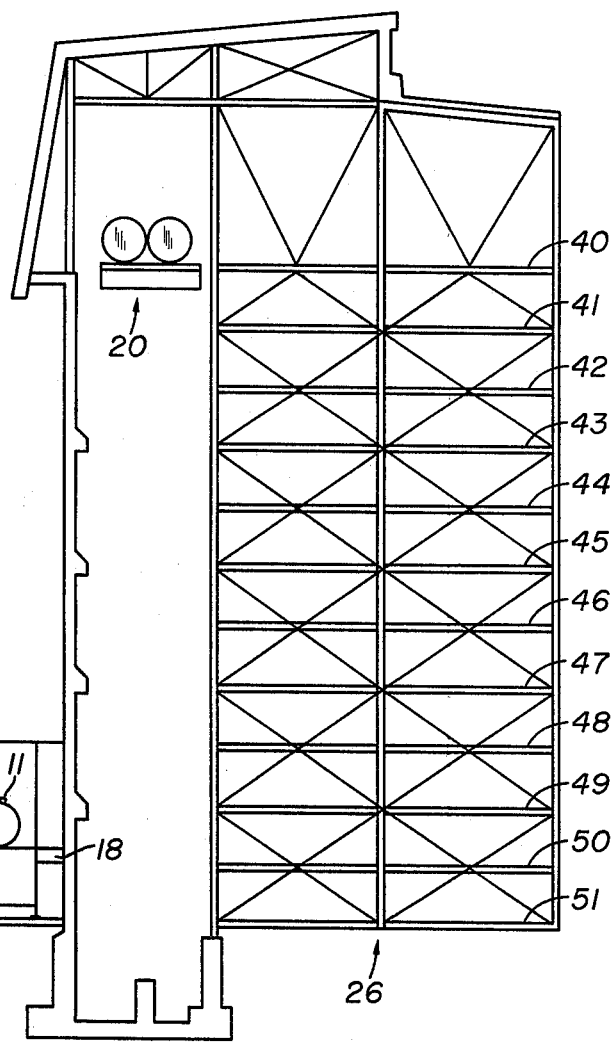
FIG. 1 is a diagrammatic side view of a system for locating barrels on store-racks according to the present invention.
Figure 2:
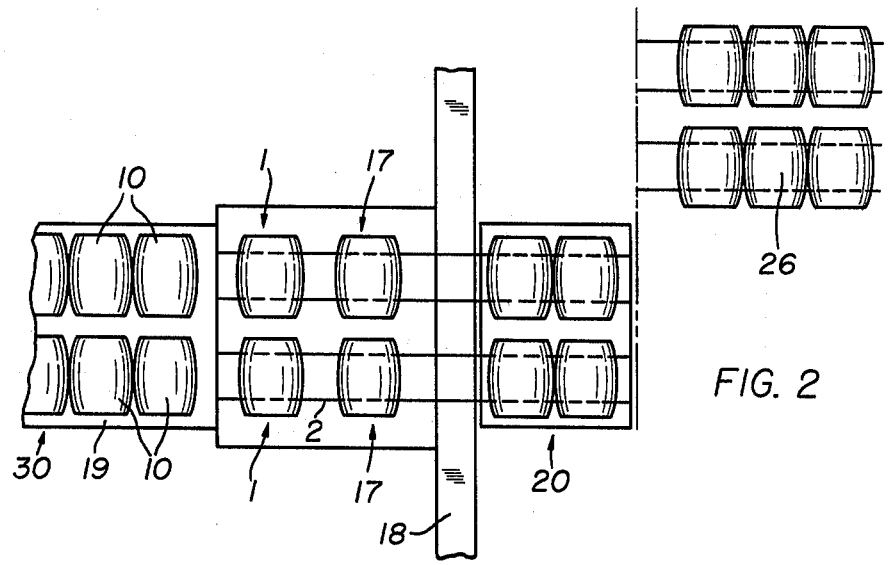
FIG. 2 is a plan view of the system of FIG. 1.

FIG. 1 is a side view of a system for locating barrels on store-racks. Barrels 10 are loaded on a platform 19 of a truck 30. A position-presetting station is located behind the truck 30 whereat the position of a barrel transferred from the truck is preset so as to allow the barrel to be properly located in a given position on a store-rack, with the plug 11 of the barrel positioned at the top of the barrel. A buffer station 17 is provided for transferring a barrel 10 from the position-presetting station 1 to assume its stand-by position to be further transferred by a stacking crane 20. The stacking crane 20 waits for a barrel to come from the buffer station 17 via a stand-by station 18 located between the buffer station 17 and crane 20. In FIG. 1, the stacking crane 20 is shown lifted to its top position to transport barrels onto the top rack 40 of store-racks 26, which comprises a plurality of racks 40-51. As has been described earlier, barrels 10 should be positioned on the racks 40-51 with their plugs 11 positioned at the top of each barrel. FIG. 1 is a plan view of the system for locating barrels on racks of FIG. 1. In FIG. 2 there are shown two rows of barrels 10. Double rows of barrels and correspondingly two position-presetting stations 1 are used to enhance the efficiency of loading barrels on the racks.

Figure 3:
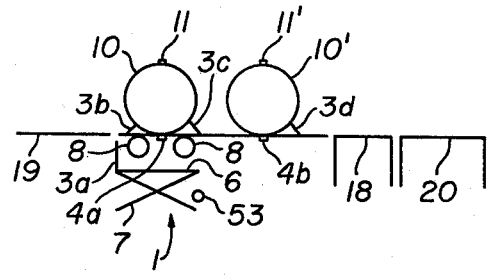
FIG. 3 is a simplified diagrammatic view of a position-presetting station of barrels, and a stacker crane.
Figure 4:
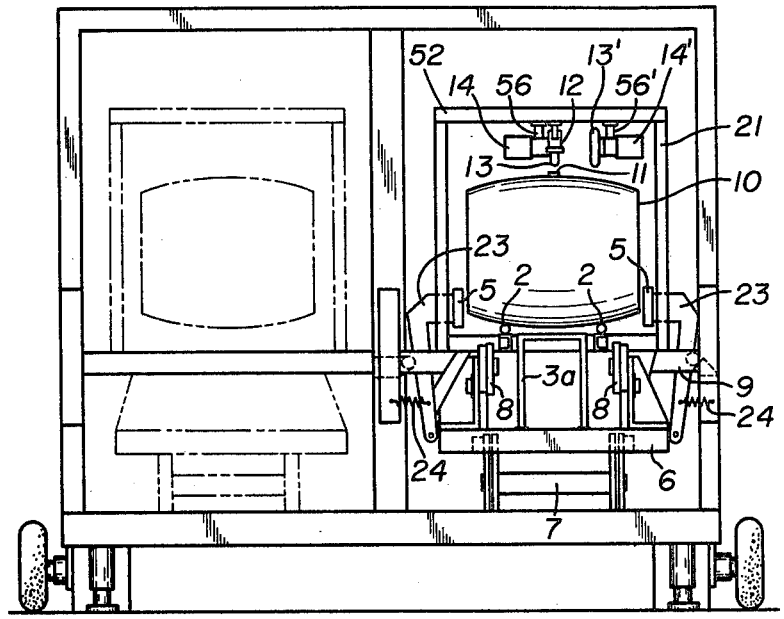
FIG. 4 is a front view of a position-presetting station with a barrel in place.
Figure 5:
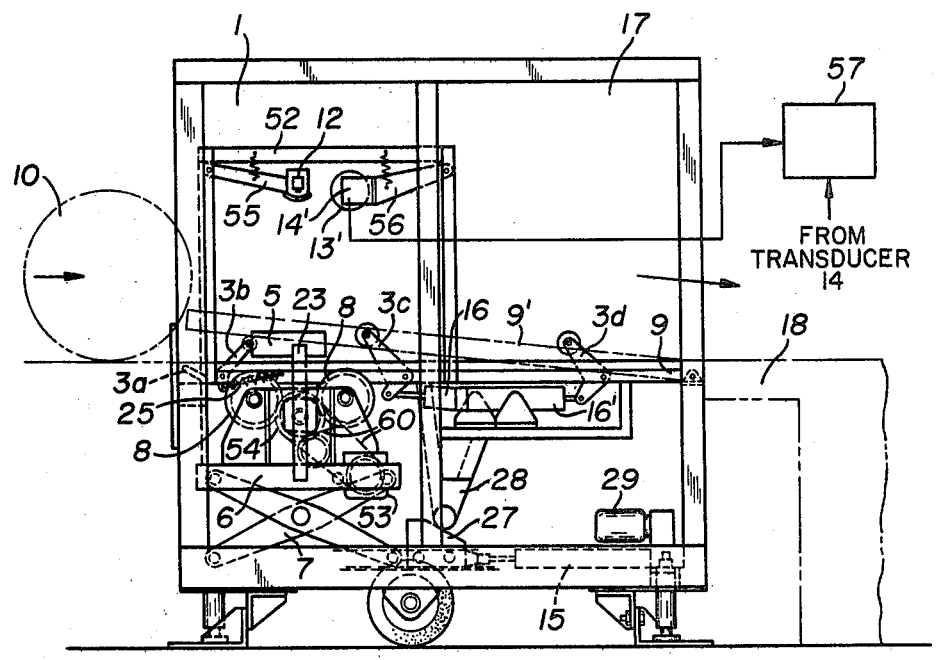
FIG. 5 is a side view of the position-presetting station of FIG. 4 with the barrel removed.

FIGS. 3 to 5 show more detailed views of the position-presetting stations 1. FIG. 4 is a front view of the position stations, although only one of the stations for only one of the two rows of barrels is shown in detail. The other station 1 is identical to the one shown in detail in FIG. 4. FIG. 5 is a side view of the position-presetting station 1 shown in detail in FIG. 4. A pair of rails 2,2 are positioned horizontally, as shown in FIG. 4. As best shown in FIG. 5, a stopper 3a is attached to a platform 6 which is in its lowered position. Likewise, a set of barrel turning discs 8,8 are positioned below rails 2. A pair of stoppers 3b and 3c are pivotally movable between lowered and raised positions, the stoppers 3b and 3c in their raised positions (FIG. 5) protrude above the surfaces of rails 2,2. As shown in FIG. 4, a pair of position-adjusting guides 5,5 are attached to the sides of the platform 6. The position-adjusting guides 5,5 are connected to arms 23,23 which are pivotally connected to the sides of the platform 6. Springs 24 are connected between the arms 23 and the frame of position-presetting station 1. The spacing between the two guides 5,5 is greater than the length of a barrel at the transporting side, namely at the left of FIG. 5, and becomes smaller towards a barrel-circumference-measuring position. Thus, a barrel is rolled and guided by means of the position-adjusting guides 5,5 so as to arrive exactly at a predetermined measuring position at the position-presetting station 1. More particularly, if the center of a rolling barrel is out of center with respect to the pair of rails 2,2, then either one of the ends of the barrel 10 contacts either one of the guides 5,5 and is guided thereby, so that the barrel 10 is automatically properly positioned between the guides 5,5 with respect to center of the barrel and center of rails 2,2, during the time which the barrel is rolling on the rails. Tolerances in the length of a barrel may be compensated for by pushing springs 24,24. When the barrel 10 is rolled on the rails 2,2 from the platform 19 of a truck to the position-presetting station 1, the barrel 10 rides over the stopper 3b to push same downwards and then abuts against the stopper 3c to thereby stop thereat. After the barrel 10 passes over the stopper 3b, the stopper 3b is returned to its raised position under the action spring 25. The stopper 3c is pivotally moved between its lowered position and its raised position by means of a power cylinder 16. When the barrel 10 stops at the stopper 3c, then a limit switch 4a under the barrel (shown in FIG. 3) is depressed, thereby issuing an instruction signal to a motor 29 and a power cylinder 15, so that a scissors-type lifter 7 may begin moving upwards to lift the platform 6 upwards. The stopper 3a which is pivoted to the platform 6 moves upwards together with the platform 6, thereby blocking the next barrel from being transferred into the position-presetting station 1. Simultaneously therewith, a set of discs 8,8 which are rotatably mounted on the platform 6 move upwards between the rails 2,2 so as to lift the barrel 10 off of the rails 2,2 (i.e., the barrel is now positioned above the rails 2,2).

As the lifter 7 moves upwards, the spacing between the pair of guides 5,5 is spread to a further extent, thereby releasing the barrel 10 from the grip of guides 5,5. When the barrel departs from rails 2,2 and contacts rollers 13 and 13', the lifter 7 is stopped and maintained in its raised position. The roller 13 contacts the central portion of the barrel 10 and measures the maximum circumference of the barrel. The roller 13' measures the circumference of the barrel at the part where the barrel contacts a rail 2,2. The rollers 13,13' are mounted on respective arms 56 and 56' which are pivoted to the undersurface of a top beam 52 of the frame 21 as best shown in FIG. 4. When the lifter 7 stops, the discs 8,8 start rotating to thereby turn the barrel 10 thereon. In general, the discs 8,8 are provided four in number, two on each side. However, discs 8,8 on one side may be drive discs, while the other discs 8,8 on the other side may be idler discs. The discs 8 are driven by a motor 53 and drive wheel 54 via chains or belts 60 as seen in FIG. 5. When the barrel 10 starts rotating under the drive of discs 8, then a reflecting type photoelectric tube switch 12 (FIG. 5) pivoted to the top beam 52 of the frame 21 via an arm 55 will detect a plug 11 embedded in the shell of the barrel 10. The photoelectric switch 12 is located over the central portion of the barrel (i.e., over the bulging portion of the barrel) and may be positioned in contact with the barrel thus lifted or may be spaced a distance therefrom. Alternatively, the photoelectric switch 12 may be affixed to an arm 56 which carries the measuring roller 13. The photoelectric switch arm 55 is not shown in FIG. 4 for ease of illustration. Its actual position in FIG. 4 should be apparent from FIG. 5.

The plug 11 is normally red in color so as to be easily distinguishable from the other part of the shell of the barrel 10. When the photoelectric switch 12 detects the position of the plug 11, then a signal is fed to transducers 14,14' secured to rollers 13,13'. The transducers 14,14' transduce the rotation of the rollers 13,13' into signals (preferably digital signals) which in turn are fed to a computation control circuit 57 (i.e., a respective counter for the digital signals from transducers 14,14'). The computation control circuit 57 converts a digital pulse input into a numerical dimension of a circumference, and stores same therein. For example, the number of pulses counted in control circuit 57 is proportional to the circumference dimension being measured. When the barrel 10 is further rotated, and the switch 12 again detects the position of plug 11, then the measurement of the circumferences at the different parts of a barrel will be completed. The computation control circuit 57 gives an instruction indicating whether the barrel may be properly admitted in a given position on a rack, by calculating a maximum diameter of a barrel from the maximum circumference of the shell of the barrel, and a distance from the barrel thus held between the stoppers 3b and 3c to its eventual position on the rack. If the barrel is allowed to go to a rack according to the calculation by means of the computation control circuit, then the circuit 57 determines such a position of the plug 11 at the position-presetting station by calculation of the circumference contacting rails and the aforesaid distance from a barrel to the desired given position on the rack. This allows the barrel to be eventually positioned in a given position on a rack, with the plug 11 positioned at the top of the barrel.

On the other hand, if a signal from circuit 57 instructs that a barrel cannot be admitted on a given rack, for example rack 51, then the circuit 57 gives another instruction to transport the barrel onto an upper rack, for example rack 50. (In this case, a distance from the barrel to a given position on the upper rack 50 is measured beforehand, and stored in the computation control circuit 57, and detection of plug 11 and measurement of circumferences are repeated). Like the previous case, the position that the plug 11 should take at the position-presetting station 1 is determined. According to this determination, when the plug 11 comes to the predetermined position by rotating on the discs 8,8, the discs 8 stop rotating and the barrel is transported in the above described manner.

In this respect, if the plug 11 passes through the predetermined position during determining the position of the plug, then the barrel 10 will make a further rotation, until the plug 11 comes to the desired predetermined final position. More particularly, the barrel 10 should make at least three rotations. The first rotation is to detect the position of a plug 11, the second rotation is to measure the circumference, and the third rotation is to bring the plug 11 to a predetermined position. For measuring the maximum circumference and the circumference of the shell of a barrel at the points of contact between the barrel and the rails 2, the entire circumference need not be measured. Measuring only ½ to ¼ of its circumference is sufficient for estimation of the entire circumference. The aforesaid estimation is preferable, particularly in case the maximum circumference, namely, the maximum diameter of the barrel, is measured for preventing an error in measurement which occurs from the plug 11 protruding from the peripheral surface of the barrel. According to a preferred embodiment of the invention, the circumference of a shell of a barrel at the points of its contacting the rails 2,2 is obtained by measuring the entire circumference, while the maximum circumference of the barrel is obtained by calculation based on the number of pulses issued for a given duration (for example 2 or 3 seconds) from the transducers 14,14', and by the circumference of the barrel at the points of its contacting the rails 2,2. When the turning discs 8,8 are stopped and the plug 11 is positioned in a predetermined position, then the lifter 7 begins descending, with the stopper 3a, whereupon the frame 9 supporting rails 2 is inclined together with the rails 2. In this respect, the frame 9 remains in the side of stand-by station 18, with the other end of the frame 9 (on the side of the truck 19) raised. An inclined angle of the frame 9 is about 6 degrees, while the inclination of the frame 9 begins, following the completion of the descending of the lifter 7 by means of the power cylinder 15. Stated differently, the frame 9 is inclined upwards, because a cam 27 connected to a shaft coupled to the power cylinder 15 is retracted into the cylinder, i.e., to the right as viewed in FIG. 5, and an arm 28 engaging the sloped surface of the cam 27 is raised. In this respect, the arm 28 supports the frame 9 thereon. An inclined position of the frame 9 is shown by a two point chain line 9'. The frame 21 carrying the measuring rollers 13,13' thereon is also inclined together with the frame 9 so as to prevent interference of the barrel 10 with the measuring rollers 13,13', when the frame 9 is inclined. Descending of the lifter 7 brings a spacing of the guides 5,5 back to the initial spacing, i.e., a narrow spacing. When the rails 2 begin inclining, when the buffer section 17 is not occupied by a barrel, then the barrel 10 rolls into the buffer station 17, due to the lowering of the stopper 3c. The stopper 3d in the buffer station 17 is pivotally moved to its raised position, so that the barrel 10 is stopped thereat. In case a barrel 10' is already present in the buffer station 17 (see FIG. 3), the limit switch 4b as shown in FIG. 3 is depressed by the barrel 10'. As a result of depression of switch 4b, the stopper 3c remains in its raised position. When the buffer station 17 is occupied by the barrel 10', i.e., when the limit switch 4b is depressed, if a sign is given, indicating that the stacker crane 20 is positioned in the stand-by station 18, then the stopper 3d is lowered in association with the inclination of the frame 9, so that the barrel 10' is shifted to the stand-by station 18. Following this, the stopper 3c assumes its lowered position, so that the barrel 10 in the position-presetting station 1 is transferred through the buffer station 17 and stand-by station 18 to stacker crane 20. Upon completion of the transfer, then the stopper 3d is pivotally moved to its raised position. The operation of the stoppers 3c, 3d are effected by means of the power cylinder 16 and 16' respectively. If the barrel 10 is fed out from the position-presetting station 1, then the frame 9 descends to its initial position, and the stopper 3c assumes its raised position, thereby waiting the next barrel to come. The aforesaid transferring operation and the buffer operation for the subsequent cycle are both carried out automatically.

Description has been given of one cycle of operation for locating a barrel in a predetermined position on a store-rack. It is preferable that a plurality of rows of barrels be handled at the same time by increasing the capacity of stacker cranes, the number of cranes, and the like. FIGS. 1 and 2 show examples where two rows of barrels are handled at the same time. FIG. 4 shows the same example, although only half thereof is shown.

In this manner, barrels coming in the position-presetting station 1 one after another may be located on a store-rack properly. A rolling distance of the succeeding barrel is automatically corrected by the maximum diameter of the preceding barrel for the succeeding operation. As has been described earlier, if a sign is given, indicating that a barrel cannot be admitted in a predetermined position of the racks, then an instruction is given to transport a barrel to the next rack, and then the aforesaid measurement and calculation is repeated to obtain a proper angle of the barrel, i.e., the position of a plug on the presetting position with respect to the vertical line. Further, in case the device including the position-presetting station and the buffer station, stand-by station and stack cranes and the like are shifted to another position, then a rolling distance of a barrel may be corrected, as the case may be. In this manner, barrels are automatically located in their predetermined positions on the store-racks. It is permissible to have an error in the position of a plug, eventually stored, due to slip, moment of inertia and an electrical time lag falls in the range of ± 5°, with respect to the vertical line, i.e., a top position of the plug of the barrel on the racks. As long as the position of a plug falls in this range, there is no danger of leakage of liquor. It should be clear that the aforesaid locating operation of the barrel which is automatically carried out may be switched to a manual operation, as required.

Figure 6:
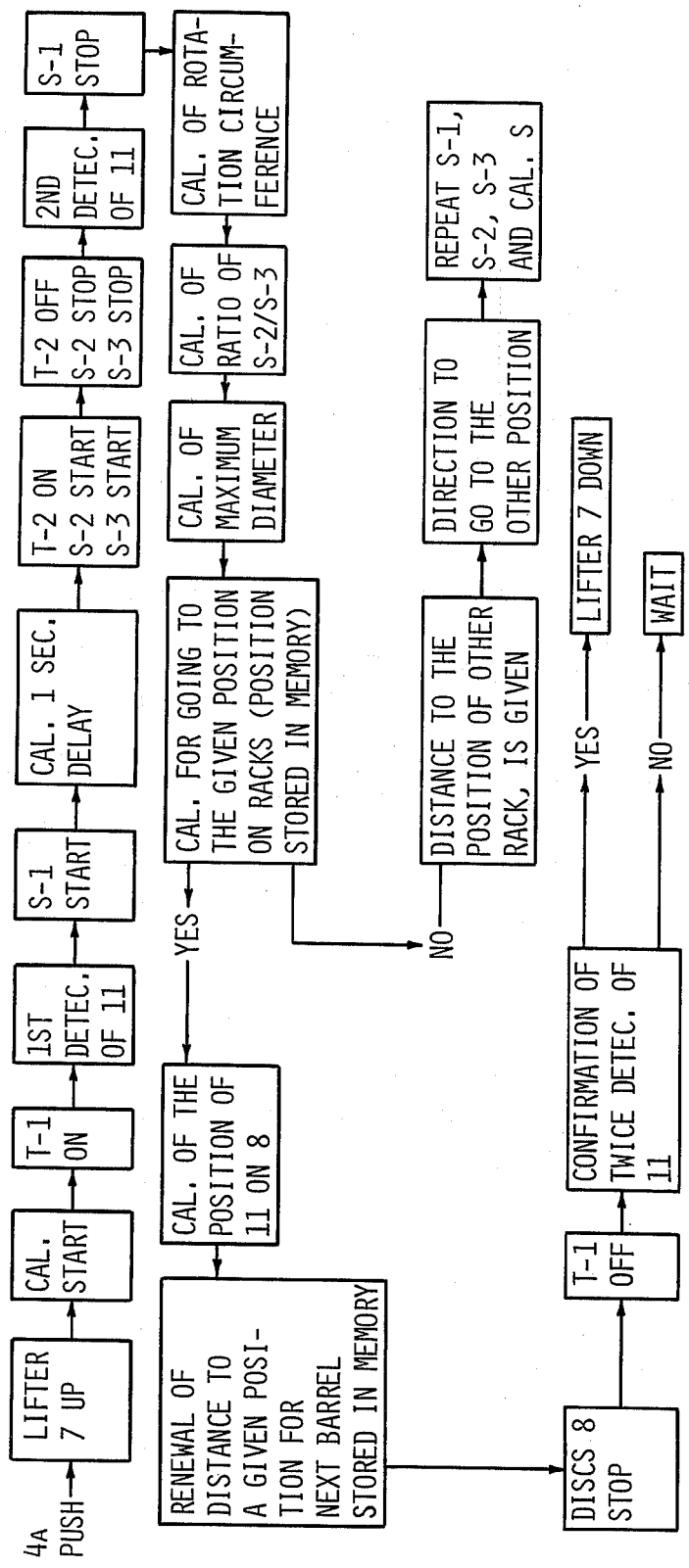
FIG. 6 is a flow chart illustrating the operation of the calculation control circuit.

FIG. 6 illustrates a flow chart of the operation of a typical calculation control circuit 57 which is generally shown in FIG. 5. In FIG. 5 all of the interconnections between the control circuit 57 are not shown for ease of illustration. The flow chart of FIG. 6 is self-explanatory in view of the legends and explanations given thereon.

Figure 7:
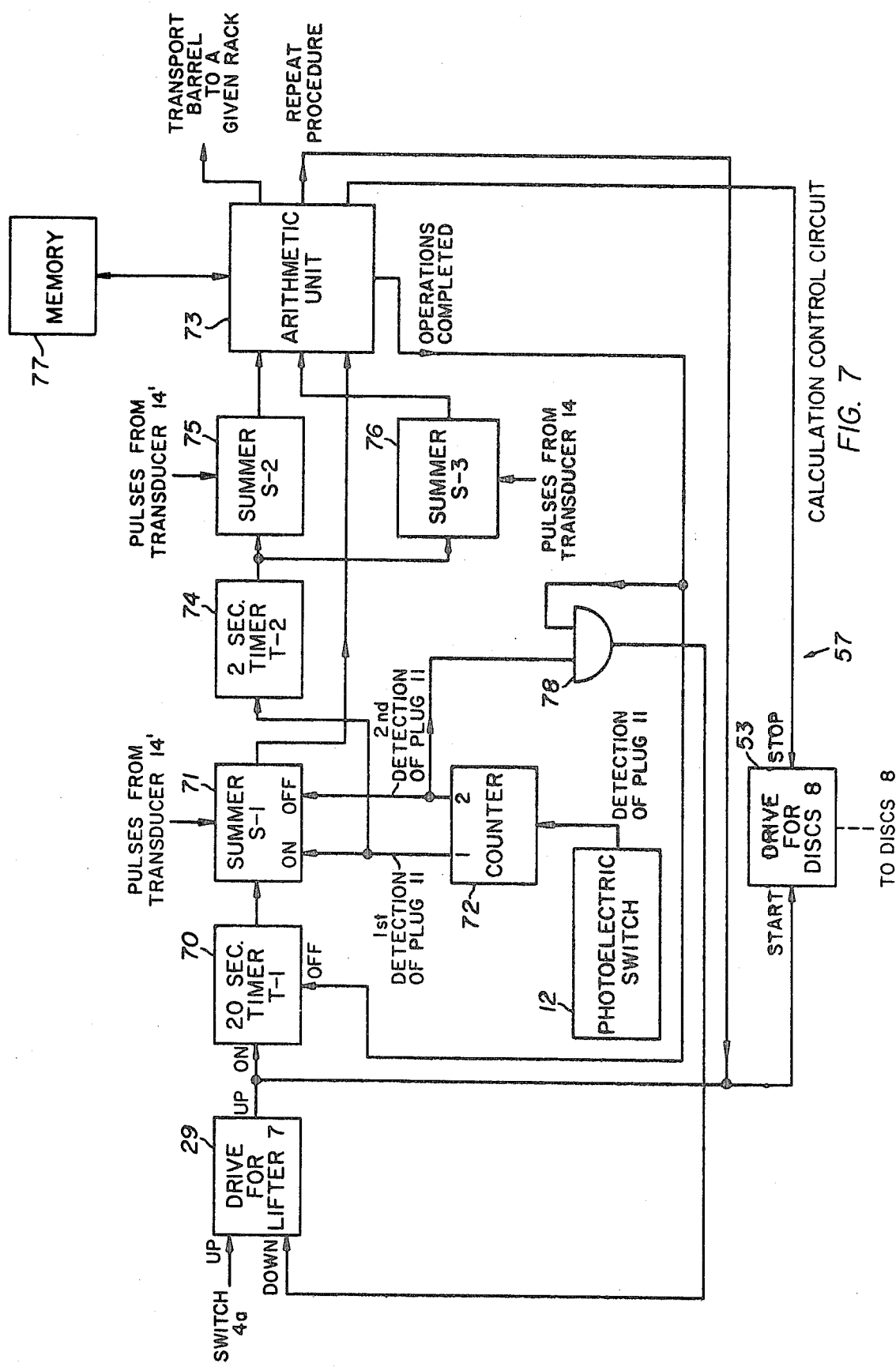
FIG. 7 is a simplified block diagram of a calculation control circuit the flow charge of which is shown in FIG. 6.

FIG. 7 illustrates a typical calculation control circuit 57 for carrying out the operations described above and illustrated in the flow chart of FIG. 6. As illustrated in FIG. 7, the calculation control circuit generally includes a timer 70 which has, for example, a 20 second timing period for confirmation of the calculation. All of the calculations should be performed within this 20 second time period. The timer enables a summing device 71 which sums up the pulses from transducer 14' to obtain a sum value S-1. The sum value S-1 is the sum of the pulses from transducer 14' from the time of the first detection of plug 11 by photoelectric switch 12 to the second detection of plug 11. The first and second detections are indicated, for example, by a counter 72 coupled to the photoelectric switch, the output of which is coupled to the summer 71. The output of the summer 71 is coupled to an arithmetic unit 73 for performing the various computations on the pulses as described hereinabove.

Upon the first detection of the plug 11, a timer 74, with a timing period of for example two seconds, is enabled and the output thereof enables a summing device 75 which sums the number of pulses from transducer 14' for the time period of the timer 74. The timer 74 also enables a summing device 76 which sums the pulses from transducer 14 for the timing period of timer 74. The outputs of summers 75,76 are fed to the arithmetic unit 73. The arithmetic unit 73 calculates the rotation circumference of the barrel, the ratio of S-2/S-3, the maximum diameter of the barrel and the distance for going to a given position on the racks, which distance is obtained from memory 77. Memory 77 stores the various distances to the various racks and may be up-dated by the arithmetic unit when a new barrel is fed into a given rack. After these calculations, if the arithmetic unit determines that a barrel is the appropriate size so that it may be received in a given rack (the distance to which was received from memory), the arithmetic unit then calculates the position that the plug 11 must assume in order that it will be transported properly to the given rack in a manner that the plug 11 will be situated in its uppermost position when the barrel reaches its final position on the given rack. The above calculations leading to this operation are relatively simple and are based on geometric principles. The arithmetic unit issues a signal, when operations are completed, to stop the drive discs 8 so that the barrel stops rotating at the proper point. Arithmetic unit 73 also issues a signal which is fed to an AND gate 78 which, in turn, issues a signal to lower the lifter 7 so that the barrel may be transported to the next position in the system.

The elements illustrated in FIG. 7 are all elementary units and may be easily implemented by one ordinarily skilled in the art in view of the descriptions hereinabove.

As is apparent from the foregoing description, barrels carried on a truck may be automatically located in their predetermined positions on store-racks, with plugs thereof being positioned at the top of each barrel, thereby saving much time and effort required for locating barrels on the racks.

While the present invention has been described herein with reference to a certain exemplary embodiment thereof, it should be understood that various changes, modifications, and alterations may be effected without departing from the spirit and the scope of the present invention, as defined in the appended claims.

What is claimed is:

1. A system for storing and orienting barrels in store-racks, with their plugs positioned at the tops of said barrels, respectively, comprising:
    a position-presetting station;
    a stand-by station adjacent to said position-presetting station;
    a storage station adjacent to said stand-by station, said storage station including a plurality of store-racks and a movable stacker crane interposed between said racks and said stand-by station for transporting barrels therebetween;
    said position-presetting station including a pair of spaced rails for receiving rolling barrels thereon one after another; a pair of stoppers spaced apart in the direction of rolling of said barrels on said rails, each of which are pivotally movable within a generally vertical plane between raised and lowered positions and which are adapted to hold a barrel therebetween when in their raised positions; a pair of spaced-apart position-adjusting guides positioned externally of said rails, the spacing of said guides being narrower towards a barrel-circumference measuring position; barrel turning means selectively movable into and out of engagement with said barrels for selectively rotating said barrels; a plug-position-detecting means pivotally mounted above said barrels and positioned above said barrel turning means for detecting a plug on a barrel; measuring rollers pivotally mounted above said barrels and above said barrel turning means, said measuring rollers being adapted to measure a maximum circumference of a respective barrel and a circumference of said respective barrel at the points where said respective barrel contacts said rails on which said barrel rolls from said position-presetting station to its desired final position in said racks; and a barrel position-calculating control circuit electrically connected to said measuring rollers and electrically connected to said plug-position-detecting means, for stopping the operation of said barrel turning means when said plug is oriented at a predetermined position whereby when said barrels are transported to their respective desired final position in said store-racks by said stacker crane, said plugs will be positioned at the uppermost position of said barrels.

2. A system according to claim 1, comprising a spring coupled to one of said stoppers on the upstream side for urging said upstream stopper to its raised position; and a power cylinder coupled to the other of said stoppers for moving said other stopper between its raised and lowered positions.

3. A system according to claim 1, comprising a support on which said barrel turning means is mounted, said support including a lifter for raising and lowering said barrel turning means and a power cylinder coupled to said lifter and being actuated by a limit switch positioned on said support.

4. A system according to claim 1, wherein said plug is colored differently from that of the other parts of a barrel.

5. A system according to claim 1, comprising a transducer coupled to said measuring rollers for producing digital signals as a function of the rolling of said measuring rollers on a barrel surface, and wherein said calculating control circuit includes means for converting said digital signals from said transducer into a numerical dimension of a circumference of a barrel; and means for storing said numerical circumference dimensions.

6. A system according to claim 2, comprising a buffer station, including a stopper operated by a power cylinder positioned between said position-presetting station and said stand-by station.

7. A system according to claim 1, wherein said barrels are fed to said position-presetting station at least in one row.

8. A system according to claim 1, wherein said barrels are fed to said position-presetting station at least in two adjacent rows.

9. A system according to claim 1, wherein said spaced rails for receiving rolling barrels are pivotally mounted in said position-presetting station and are selectively inclinable.

10. A system according to claim 1, wherein said barrel turning means comprises a set of barrel turning discs rotatably mounted in said position-presetting station and which are selectively raised into engagement with said barrels for selectively rotating said barrels, and which are selectively lowered out of engagement with said barrels.

11. A system according to claim 1, wherein said plug-position-detecting means comprises a photoelectric sensing means mounted above said barrels for detecting a plug on a barrel.

* * * * *